(12) United States Patent
Natanzon et al.

(10) Patent No.: US 8,726,066 B1
(45) Date of Patent: May 13, 2014

(54) JOURNAL BASED REPLICATION WITH ENHANCE FAILOVER

(75) Inventors: Assaf Natanzon, Ramat-Gan (IL); Jehuda Shemer, Kfar Saba (IL)

(73) Assignee: EMC Corporation, Hopkinton, MA (US)

( * ) Notice: Subject to any disclaimer, the term of this patent is extended or adjusted under 35 U.S.C. 154(b) by 394 days.

(21) Appl. No.: 13/077,271

(22) Filed: Mar. 31, 2011

(51) Int. Cl.
*G06F 11/00* (2006.01)
(52) U.S. Cl.
USPC ............... 714/4.11; 714/2; 714/4.1; 714/6.3
(58) Field of Classification Search
USPC ...................................... 714/4.11, 2, 25, 6.3
See application file for complete search history.

(56) References Cited

U.S. PATENT DOCUMENTS

| | | | |
|---|---|---|---|
| 8,156,375 B1* | 4/2012 | Greene et al. | 714/15 |
| 2008/0229143 A1* | 9/2008 | Muraki | 714/5 |
| 2012/0151248 A1* | 6/2012 | Bower et al. | 714/4.11 |
| 2012/0166886 A1* | 6/2012 | Shankar et al. | 714/43 |

\* cited by examiner

*Primary Examiner* — Sarai Butler
(74) *Attorney, Agent, or Firm* — Krishnendu Gupta; Joseph D'Angelo

(57) ABSTRACT

A method, system, and computer product for data replication comprising enabling a second site to receive I/O from a first site; wherein the second site stores the I/O in a journal until transferring the I/O to an image, regulating, at the first site, an application by delaying acknowledgements of I/O requests from the application, and controlling the size of a do stream in the journal by slowing a response of a splitter.

20 Claims, 12 Drawing Sheets

JOURNAL BASED REPLICATION WITH ENHANCE FAILOVER

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer product for data replication comprising enabling a second site to receive I/O from a first site; wherein the second site stores the I/O in a journal until transferring the I/O to an image, regulating, at the first site, an application by delaying acknowledgements of I/O requests from the application, and controlling the size of a do stream in the journal by slowing a response of a splitter.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION

Figure 1:
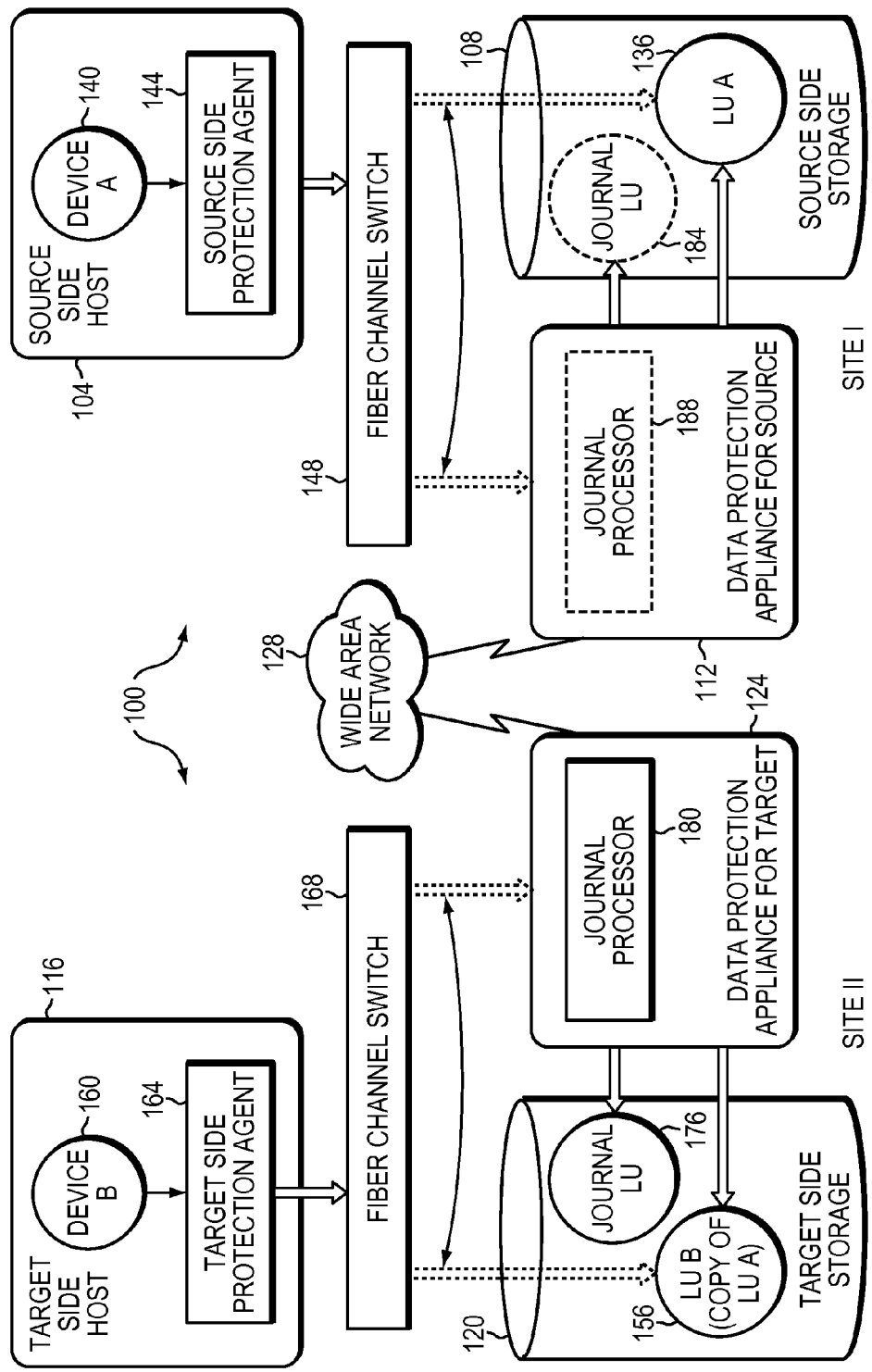
FIG. 1 is a simplified illustration of a data protection system, in accordance with an embodiment of the present invention.

Typical failovers between a production site and a replication site may take minutes to perform. Generally, any delay in time during a failover may be time that the production site is unavailable. Usually, this may stop any processing that may have occurred at the production site.

In most cases, a failover may take a couple of minutes to complete may be because of the lag in the system. Conventionally, journal based replication may provide asynchronous replication where the production site is not constrained or only minimally slowed by the replication. Usually, this may result in the replication site having IOs that have been processed on the production site but may be waiting to be processed on the replication site. Typically, the IOs may be stored in a journal on the replication site before being applied to a copy of the production site image on the replication site. When a failover occurs, the replication site may process these IOs to create the same image that was on the production site before the production site may be failed over to the replication site. Generally, this time delay is not desired.

In an aspect of the current disclosure, the delay to failover from a production site to a replication may be reduced, in some cases to be less that a couple of seconds.

In some embodiments this may allowing for instance failing over an nfs service without loss of connections.

In other aspects of the current disclosure, the production site may be regulated to slow the lag between the production site and the replication site. In certain embodiments, this may occur through regulation of the applications on the production site. In at least some embodiments, this may create a smaller lag and decrease the amount of IO to be processed on the replication site before a failover may occur.

In alternative embodiments, this may included regulating the production site to enable the journal lag of I/O stored on the replication site to be smaller then a few Gigabytes of data. In other embodiments, the regulation of the production site may be based on the data transfer rate between the production site and the replication site. In these embodiments, the production site may be controlled so that any lag between the two sites is within a specified threshold, for example half a second. In some embodiments, the meta data of the information in the replication device may be held in memory. In these embodiments, the metadata may be used to create an instant access data structure. In these embodiments, the instant access data structure may enable instant access to the image on the replication site by either reading data from the image or from the instant access data structure.

In at least one embodiment, when user wants to failover with no data loss, application may be regulated so data lag will be very a few mega bytes resulting in a transfer of outstanding IOs in less than a second. In these embodiments, IO for applications on the production site may be flushed. In these embodiments, when data arrives at the replica site, virtual access data structure may be in memory may enable access the image or volume on the replica site. In further embodiments, any lag may be determined based on the transfer rate between the replication site and production site so that any failover may take a specified period of time (i.e. 100 milliseconds, half a second, one second two seconds, one minute) based on the amount of acceptable delay to the production site.

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—Data Protection Appliance a computer or a cluster of computers, or a set o processes that serve as a data protection appliance, responsible for data protection services including inter alia data replication of a storage system, and journaling of I/O requests issued by a host computer to the storage system;

RPA—replication protection appliance, is another name for DPA.

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partally stored on the journal.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
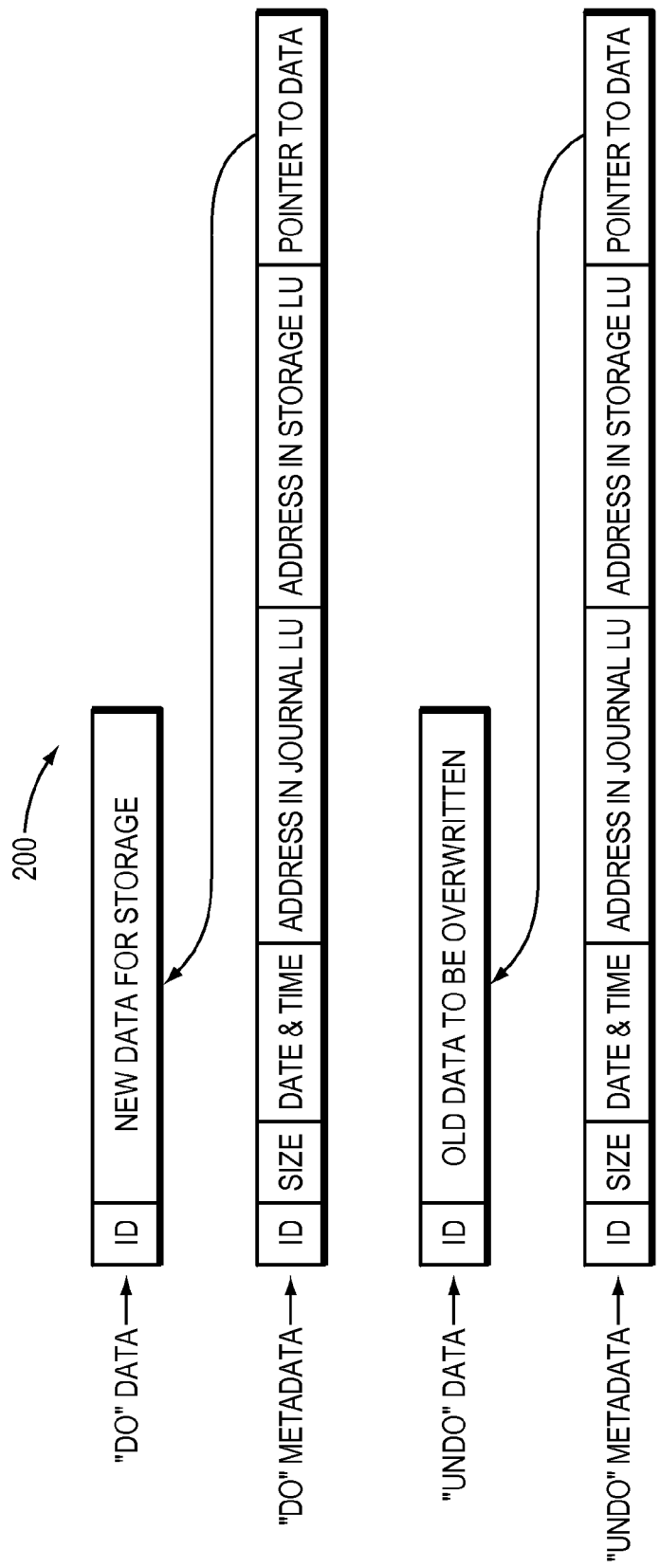
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter minors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWER-PATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes will be handled through the DPA. The host may read the undo data of the write and the appliance will store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica will be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Enhanced Failover

Figure 3:
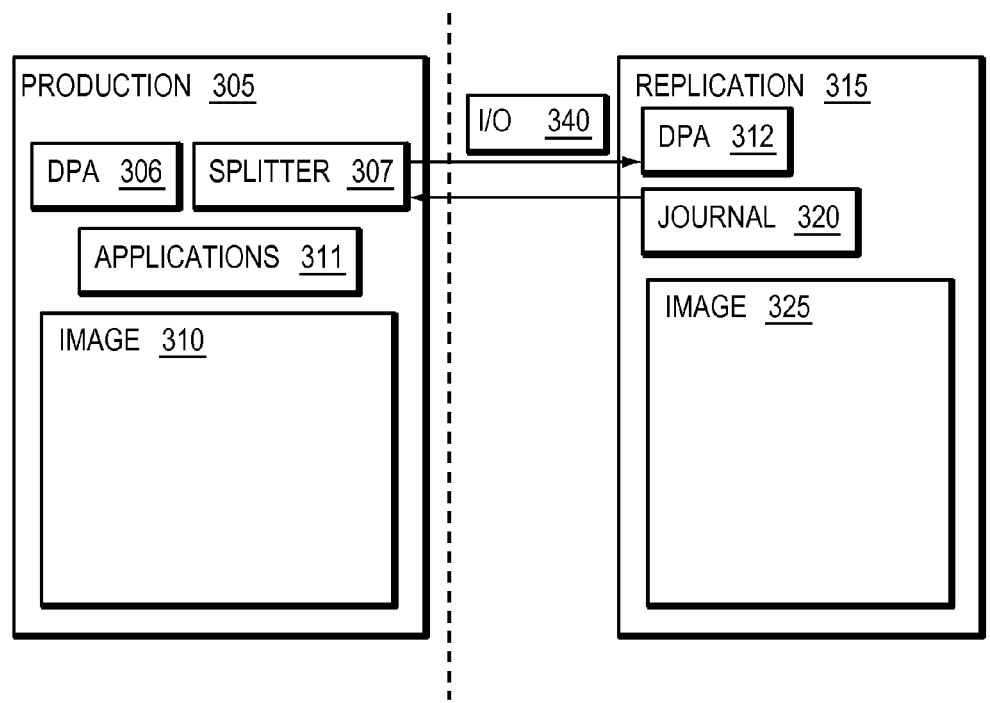
FIG. 3 is an alternative simplified illustration of a data replication system, in accordance with an embodiment of the present invention.
Figure 4:
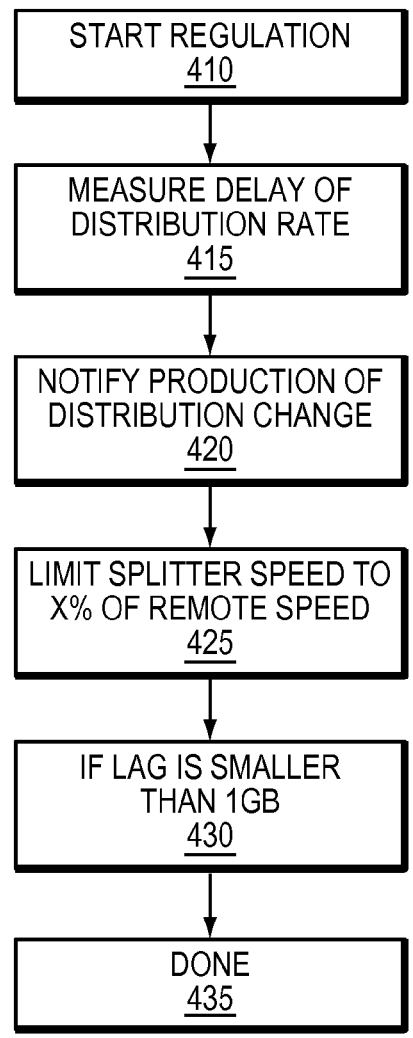
FIG. 4 is a simplified illustration of a failover method, in accordance with an embodiment of the present invention.

In an embodiment of the instant disclosure, failovers may be enabled with little to no delay. In some embodiments, the user may notify the appliance that immediate failover is required, the appliance may move to application regulation mode, i.e. delaying acknowledgements (ACKs) to the splitter in order to control the IO bandwidth. Refer now to the example embodiments of FIGS. 3 and 4. In FIGS. 3 and 4, the production site 305 may become regulated (step 410). In these embodiments, the production site 305 may be regulated by controlling the acknowledgements sent to the splitter in response to the IOs.

In some embodiments, the SCSI protocol may wait for a status before completing commands (read or write), the recover point appliance may exposes a SCSI target device and the splitter splitting the IOs acknowledge the commands and sending back status. In certain embodiments, the appliance may delay IOs and limit the splitter throughput by delaying IOs, delaying for to long may be dangerous since host may abort the IOs.

Delaying and IO for several milliseconds may limit the throughput of the host assuming the host writes with limited parallelism.

In alternative embodiments, the appliance may limit the throughput to N MB/sec, by limiting the amount of acknowledgments sent. In some embodiments, the appliance may maintain a bound determining how much more data it may be acknowledge immediately. In certain embodiments, the appliance may have a timer and may increase the bound for instance by N/100 MB after every 10 ms, and to ensure the current bound is not bigger than X MB (i.e. never allow immediate ack of more than X MB). In these embodiments, the maximal throughput may be at most N MB/sec. In some embodiments, the appliance may also add other mechanisms which may not allow any status to be delayed for more than Y seconds to avoid IO aborts.

In these embodiments, the production site 305 may be slowed as the I/O split by splitter 307 on the production site may not be sent down the I/O stack on production site 305 until an acknowledgement from DPA 306 is received. Since the I/O has not been processed on production site 305, application 311 may not receive confirmation that I/O has been processed. The application may wait for the process confirmation before continuing processing, effectively slowing application's 311 processing.

Regulation of the sites is started (step 410). The rate of the distribution from journal 320 to image 325 at site 315 may be measured (step 415). The production site is notified of the distribution rate (step 420).

The rate on the production site is limited to a function, such as X % of remote speed, for example 70% (step 425), the limit may be performed by delaying acks from DPA 306 to splitter 307. This specific value may be used to bring the lag of the do stream to be smaller than a certain amount example 1 GB. If the size of the do stream in the journal is smaller than 1 GB (step 430), then the processes may be complete (step 435).

In some embodiments, the applications may only be able write at a specific rate. In further embodiments, if the current size of the do stream is more than 1 GB, the remote site will limit the production rate to say 0.7*"DR" and the remote site sill notify the production site to limit the splitter to maximum speed of 0.7*"DR." In these further embodiments, the speed allowed may be updated say every 10 seconds, where DR is the average rate for the last minute.

Figure 5:
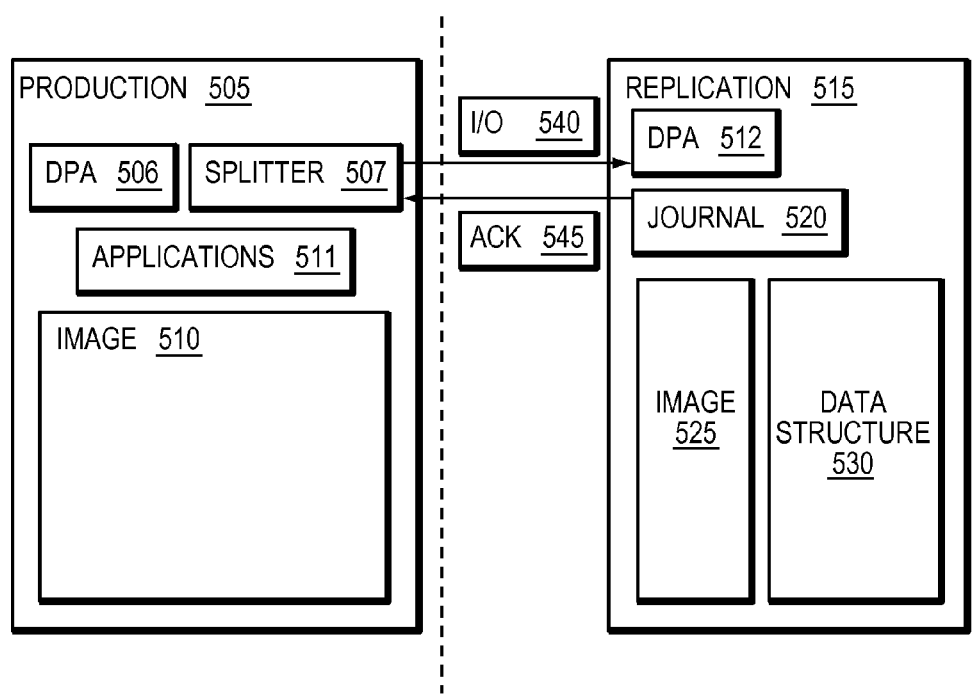
FIG. 5 is a simplified illustration of an implementation of a data replication system with an instant access data structure, in accordance with an embodiment of the present invention.
Figure 6:
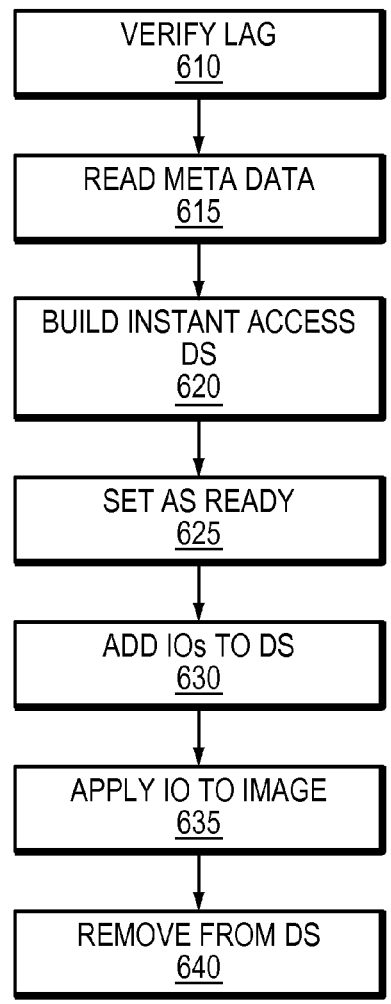
FIG. 6 is a simplified illustration of a failover method, in accordance with an embodiment of the present invention.

Refer now to the example embodiments of FIGS. 5 and 6. In these embodiments, the size of the do stream may be verified (step 610). The meta data in do stream journal 520 may be read (step 615). Data structure 530 may be built to enable instant access (step 620). Data structure 530 may be marked as ready for image access (step 625). As I/Os 540 are sent from the production site 505 to the replication site 515, the I/Os may be added to data structure 530 to enable the image to remain consistent (step 630). As the I/O are processed on the replication site 615 the I/O may be added to the user volume and removed from the journal do stream (step 635). As the I/O are processed on the replication site 515, the I/O may be removed from data structure 530 (640). In these embodiments the data structure may be built so that, if there is a read to replication site 515, it may be determined by the information in the data structure 530, if the read data is in the journal (520) or is it in the replica image (525)

In the embodiments of FIGS. 5 and 6 size of the do stream may be maintained at the specific value or further reduced to a smaller lag. In some embodiments, once the data structure is built the size of the do stream may continue to be controlled, and may be reduced further. In certain embodiments, the time lag between the sites may also be controlled and the size of the do stream may be kept to a specific value, where the lag between the sites is the time is takes an IO from the time it arrived to the DPA 506, until an ack arrives (545) that IO successfully recovered at DPA 512. In certain embodiments, the system may start reducing the Lag between the production site and the replica. In these embodiments, the latency and bandwidth between production site and replica may be measured periodically. In some of these embodiments, the lag between remote and production site may be evaluated, the production may limit the speed to be a percentage, i.e. 70%, of the available bandwidth. In certain embodiments, the regulation may continue until the delta between the production and the replica site may be at most half a second plus the average round trip between the sites. In these embodiments, once the lag between the sites is less than half a second plus the round trip time, an actual failover may be performed in less than one second.

Figure 7:
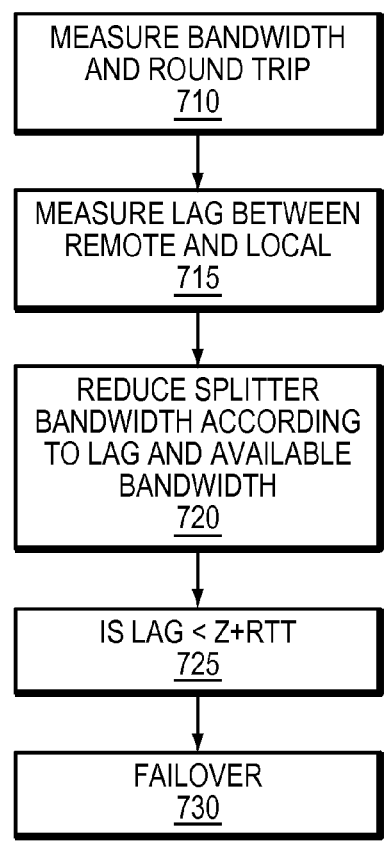
FIG. 7 is an alternative simplified illustration of a failover method, in accordance with an embodiment of the present invention.

Refer now to the example embodiment of FIG. 7. In the example embodiment of FIG. 7, the bandwidth and round trip time may be measured (step 710). The lag between the local and remote site may be measured (step 715). The splitter may be slowed according to the bandwidth and the desired lag (Step 720). A determination may be made if the lag is less that a specific figure plus the round trip time (step 725). The sites may be failed over (step 730).

Figure 8:
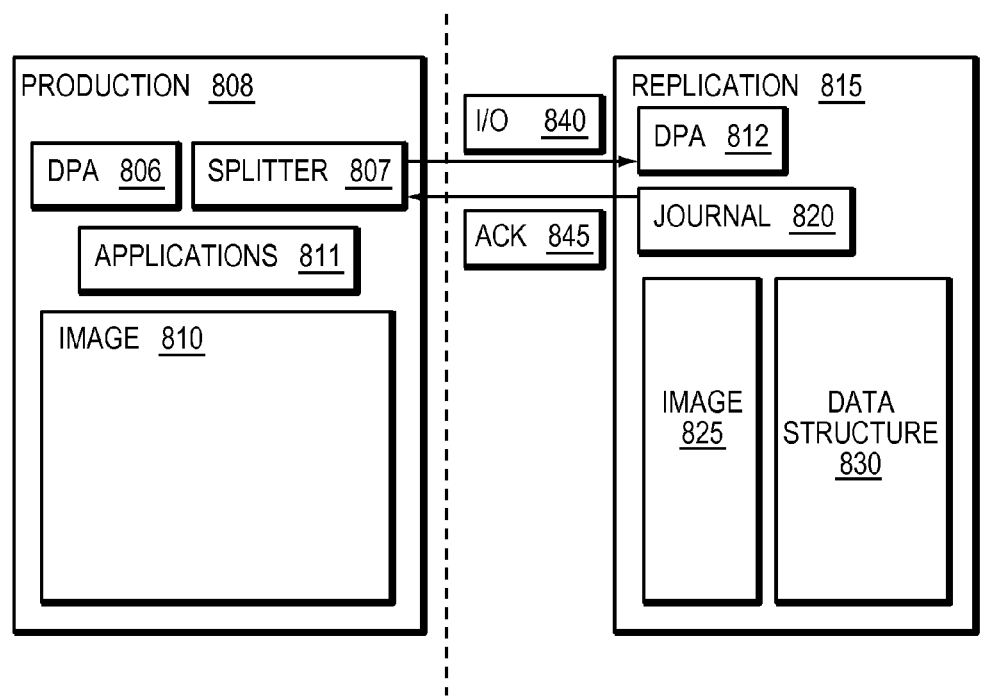
FIG. 8 is a simplified illustration of an implementation of a data replication system, in accordance with an embodiment of the present invention.
Figure 9:
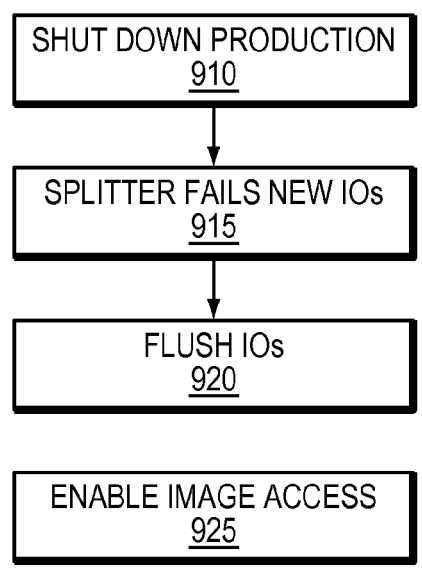
FIG. 9 is a simplified illustration of a failover method, in accordance with an embodiment of the present invention.

Refer now to the example embodiments of FIGS. 8 and 9. In these embodiments, the production application at site 805 may be shut down (step 910), the splitter may start failing all IOs (step 915). The I/Os on the production site 805 may be flushed to the replication site 815 (step 920). Image access on the replication site 815 may be enabled (Step 925). In some embodiments, once the remote site maintains image access the data may be rolled in the background from the journal to the user volume to allow direct access to the volume.

In certain embodiments, by controlling the lag between the production site and the replication site, the amount of IO in the journal at the replication site may be reduced. In some embodiments, this reduction of the I/O in the journal may enable the replication site to efficiently create an instant access data structure. In these embodiments, when a failover occurs, there may be little data that needs to be flushed from the production site to the replication site. In these embodiments, once this I/O is flushed to the replication site, the instant access data structure may enable the replication site to take over for the production site in less than a second (assuming a round trip small smaller than 0.5 seconds).

Figure 10:
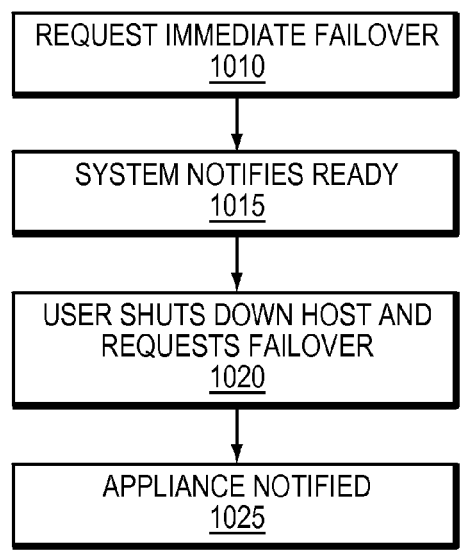
FIG. 10 is an a simplified illustration of a user initiated failover method, in accordance with an embodiment of the present invention.
Figure 11:
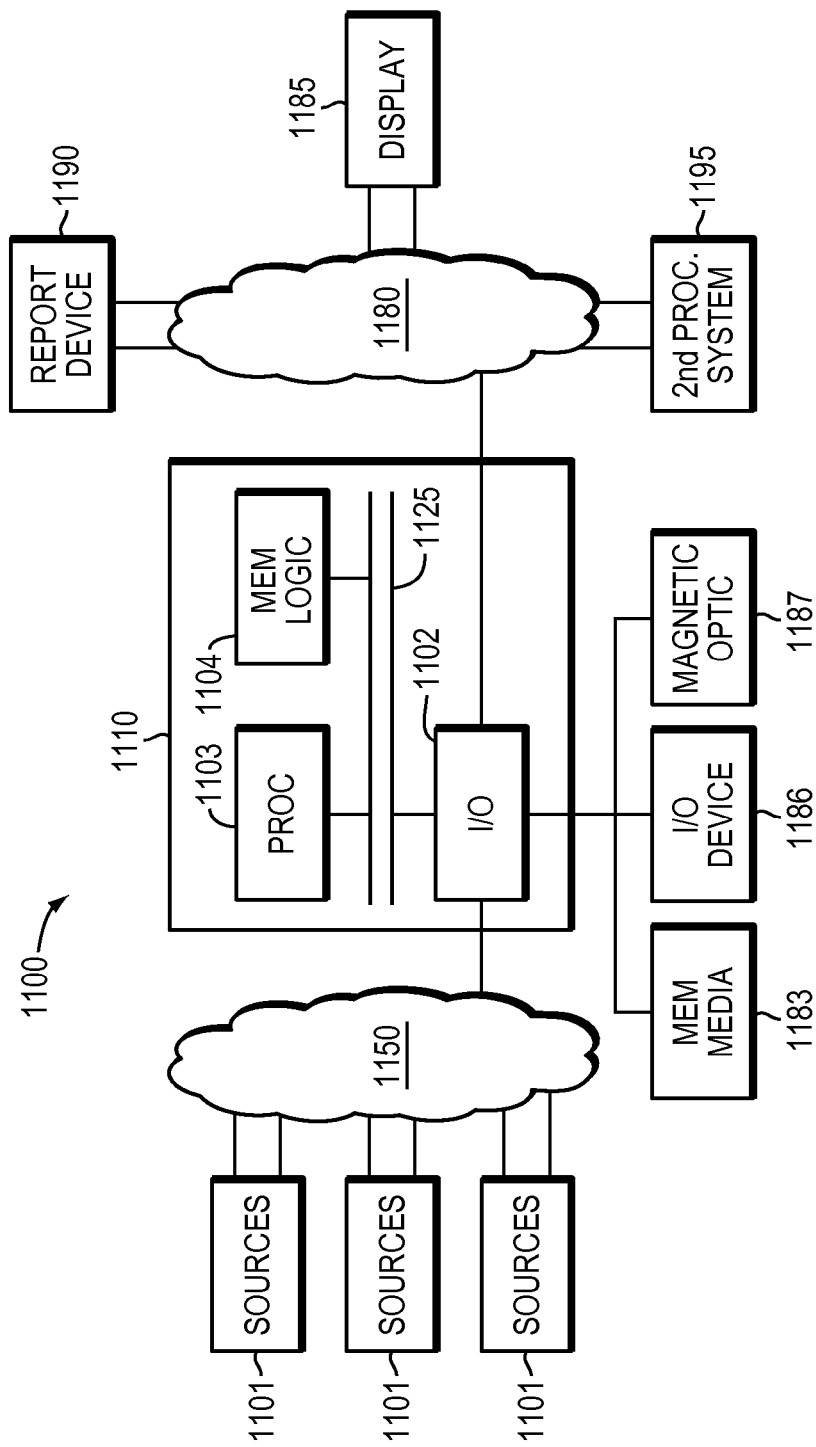
FIG. 11 is an example of an embodiment of an apparatus that may utilize the techniques described herein.
Figure 12:
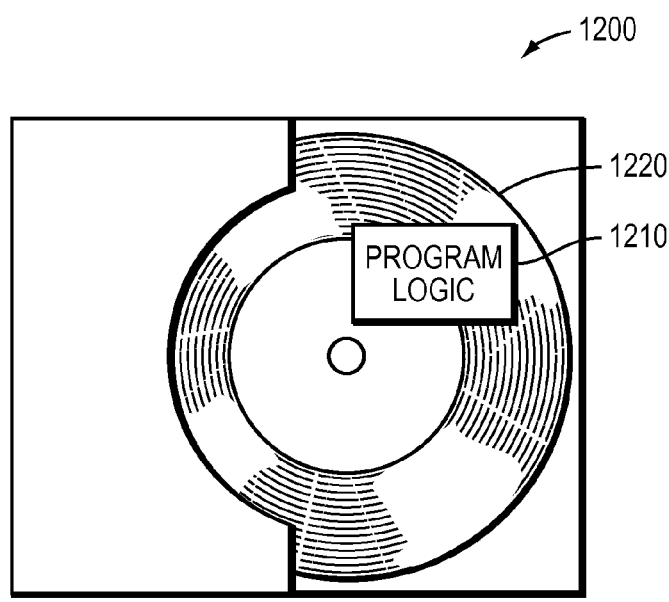
FIG. 12 is an example of an embodiment of a method embodied on a computer readable storage medium that may utilize the techniques described herein.

Refer now to the example embodiment of FIG. 10 which illustrates a sample failover. The user or the system requests an immediate failover (step 1010). The system notifies ready, when the lag is small and DS is ready (step 1015). The user shuts down the host and requests a failover (step 1020). The appliance notifies user when the failover completes and IOs may be served at replica site (step 1025).

The methods and apparatus of this invention may take the form, at least partially, of program code (i.e., instructions) embodied in tangible, non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 10 shows Program Logic 1010 embodied on a computer-readable medium 1030 as shown, and wherein the Logic is encoded in computer-executable code configured for carrying out the reservation service process of this invention and thereby forming a Computer Program Product 1000.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for data replication, the system comprising:
   a first site comprising:
      an application;
      an image; and
      a journal based replication appliance;
      a splitter;
   a second site comprising:
      a second journal based replication appliance;
      a journal;
      an image and
      computer-executable logic operating in memory;
         wherein the computer-executable logic is configured for execution of:
      enabling the second site to receive I/O from the first site; wherein the second site stores the I/O in the journal until transferring the I/O to the image;
      regulating, at the first site, the application by delaying acknowledgements of I/O requests sent from the application to the image on the first site; wherein I/O requests of the application are intercepted by the splitter; wherein the regulating includes slowing acknowledgements sent from the splitter to the application to reduce differences between the image on the first site and the image on the second site; wherein the application waits for acknowledgement of I/O sent to the image;
      controlling a size of a do stream in the journal on the second site by slowing a response of the splitter to the application.

2. The system of claim 1 wherein the splitter acknowledges the I/O request to the application upon acknowledgement from the journal based replication appliance; and wherein the computer-executable logic is further configured for execution of:
   building an instant access data structure at the second site; wherein the instant access structures leverages the journal on the second site and the image on the second site to enable access to a current point in time on the first site regardless of whether split I/O in the journal has been applied to the image; wherein I/O received from the first site are added to the instant access data structure on the second site.

3. The system of claim 2 wherein the computer-executable logic is further configured for execution of:
   enabling the journal based replication appliance on the first site to continue to delay acknowledgements until I/O lag between the image on the first site and the image on the second site is at a specified threshold.

4. The system of claim 2 wherein the computer-executable logic is further configured for execution of:
   enabling the second site to process I/O from the journal and remove processed I/O from the instant access data structure while enabling instant access to the image on the second site.

5. The system of claim 4 wherein the computer-executable logic is further configured for execution of:
   flushing IOs at the first site;
   verifying that the IOs have been received at the second site;
   enabling failover of the first site by stopping I/O on the first site and enabling access to the image on the second site; and
   for a read to the image on the second site, determining if a target of the read is in the instant access data structure and, based on the determining, either performing the read on the instant access data structure or on the image.

6. The system of claim 3 wherein the computer-executable program logic is further configured for execution of:
   responsive to interaction by a user, moving the first site to an immediate failover mode;
   preparing the first site and the second site to perform a failover by creating an instant access data structure to enable instant access to the image on the second site regardless of whether I/O in the journal has been applied to the image and lowering lag between the first site and the second site to a predetermined amount of time.

7. The system of claim 6 wherein the computer-executable logic is further configured for execution of:
   notifying the user that failover is ready; and
   performing a failover between the first and second sites.

8. A computer implemented method for data replication, the method comprising:
   enabling a second site to receive I/O from a first site; wherein the second site stores the I/O in a journal until transferring the I/O to an image;
   regulating, at the first site, an application by delaying acknowledgements of I/O requests sent from the application to the image on the first site; wherein I/O requests of the application are intercepted by the splitter; wherein the regulating includes slowing acknowledgements sent from the splitter to the application to reduce differences between the image on the first site and the image on the second site; wherein the application waits for acknowledgement of I/O sent to the image;

controlling a size of a do stream in the journal on the second site by slowing a response of the splitter to the application.

9. The method of claim 8 wherein the splitter acknowledges the I/O request to the application upon acknowledgement from the journal based replication appliance; and wherein the method further comprising:

building an instant access data structure at the second site; wherein the instant access structures leverages the journal on the second site and the image on the second site to enable access to a current point in time on the first site regardless of whether split I/O in the journal has been applied to the image; wherein I/O received from the first site are added to the instant access data structure on the second site.

10. The method of claim 9 further comprising:

enabling the journal based replication appliance on the first site to continue to delay acknowledgements until I/O lag between the image on the first site and the image on the second site is at a specified threshold.

11. The method of claim 9 further comprising:

enabling the second site to process I/O from the journal and remove processed I/O from the instant access data structure while enabling instant access to the image on the second site.

12. The method of claim 10 further comprising:

flushing IOs at the first site;

verifying that the IOs have been received at the second site;

enabling failover of the first site by stopping I/O on the first site and enabling access to the image on the second site; and for a read to the image on the second site, determining if a target of the read is in the instant access data structure and, based on the determining, either performing the read on the instant access data structure or on the image.

13. The method of claim 10 further comprising:

responsive to interaction by a user, moving the first site to an immediate failover mode;

preparing the first site and the second site to perform a failover by creating an instant access data structure to enable instant access to the image on the second site regardless of whether I/O in the journal has been applied to the image and lowering lag between the first site and the second site to a predetermined amount of time.

14. The method of claim 12 further comprising:

notifying the user that failover is ready; and performing a failover between the sites.

15. A computer program product comprising:

a non-transitory computer readable medium encoded with computer executable program code, the replication environment having a production site and a splitter, the production site having storage mediums, the code:

enabling a second site to receive I/O from a first site; wherein the second site stores the I/O in a journal until transferring the I/O to an image;

regulating, at the first site, an application by delaying acknowledgements of I/O requests sent from the application to the image on the first site; wherein I/O requests of the application are intercepted by the splitter; wherein the regulating includes slowing acknowledgements sent from the splitter to the application to reduce differences between the image on the first site and the image on the second site; wherein the application waits for acknowledgement of I/O sent to the image;

controlling a size of a do stream in the journal on the second site by slowing a response of the splitter to the application.

16. The computer program product of claim 15, wherein the splitter acknowledges the I/O request to the application upon acknowledgement from the journal based replication appliance; and wherein the code further enables:

building an instant access data structure at the second site; wherein the instant access structures leverages the journal on the second site and the image on the second site to enable access to a current point in time on the first site regardless of whether split I/O in the journal has been applied to the image; wherein I/O received from the first site are added to the instant access data structure on the second site.

17. The computer program product of claim 16, wherein the code further enables:

enabling the journal based replication appliance on the first site to continue to delay acknowledgements until I/O lag between the image on the first site and the image on the second site is at a specified threshold.

18. The method of claim 16 further comprising:

enabling the second site to process I/O from the journal and remove processed I/O from the instant access data structure while enabling instant access to the image on the second site.

19. The method of claim 16 further comprising:

flushing IOs at the first site;

verifying that the IOs have been received at the second site;

enabling failover of the first site by stopping I/O on the first site and enabling access to the image on the second site; and for a read to the image on the second site, determining if a target of the read is in the instant access data structure and, based on the determining, either performing the read on the instant access data structure or on the image.

20. The method of claim 16 further comprising:

responsive to interaction by a user, moving the first site to an immediate failover mode;

preparing the first site and the second site to perform a failover by creating an instant access data structure to enable instant access to the image on the second site regardless of whether I/O in the journal has been applied to the image and lowering lag between the first site and the second site to a predetermined amount of time; and notifying the user that failover is ready; and performing a failover between the sites.

* * * * *